United States Patent [19]

Schutt

[11] Patent Number: 4,479,824

[45] Date of Patent: Oct. 30, 1984

[54] SILICATE BINDERS AND COATINGS

[76] Inventor: John B. Schutt, 2403 Peach Stone Ct., Silver Spring, Md. 20904

[21] Appl. No.: 492,812

[22] Filed: May 4, 1983

[51] Int. Cl.$^3$ .............................................. C09D 5/10
[52] U.S. Cl. ........................... 106/14.21; 106/1.05; 106/1.17; 106/14.39; 106/74; 106/84; 106/287.16
[58] Field of Search ............... 106/74, 84, 1.17, 1.05, 106/14.21, 14.39, 287.16

[56] References Cited

U.S. PATENT DOCUMENTS

| | | | |
|---|---|---|---|
| 2,786,042 | 3/1957 | Iler | 260/37 |
| 2,891,875 | 6/1959 | Phreaner | 106/308 |
| 3,009,829 | 11/1961 | Gouveia | 117/126 |
| 3,493,401 | 2/1970 | Schutt et al. | 106/15 |
| 3,522,066 | 7/1970 | Forsyth | 106/74 |
| 3,620,784 | 11/1971 | Schutt | 106/84 |
| 4,162,169 | 7/1979 | Schutt | 106/74 |

*Primary Examiner*—Lorenzo B. Hayes
*Attorney, Agent, or Firm*—Lowe, King, Price & Becker

[57] ABSTRACT

Inorganic binders for coatings such as paints are provided which are based on high single or mixed silicon dioxide to alkali metal oxide mol ratio inorganic alkali metal silicates. The binder composition comprises a mixed silicon dioxide silica gel sol having a silica to alkali metal oxide mol ratio of about 5.5-6.5:1. The binder composition is produced from a starter alkali metal silicate aqueous solution by mixing the solution with a silicone monomer and agitating until hydrolysis is essentially complete. A silica gel is then added as an aqueous slurry and blended until the silica gel is at least partially dissolved. Thereafter, the mixture is agitated to a smooth consistency and recovered as a binder composition. The inorganic binder is particularly suitable for providing coatings or paints having good brushability and which contain zinc dust or aluminum powder for application over ferrous substrates.

15 Claims, No Drawings

SILICATE BINDERS AND COATINGS

FIELD OF THE INVENTION

The invention relates to the process of making high mixed mol ratio binders and the resulting binders. More particularly, the invention relates to alkali metal silicate binders and related coatings and methods for their manufacture.

BACKGROUND ART

The prior art includes alkali metal oxide inorganic binders, some of which are derived from silicon dioxide in the form of a sol or silicates of potassium oxide, sodium oxide or lithium oxide in the form of silicate solutions. With respect to the basic $SiO_2$-$K_2O$ binders, a 5.3:1 silicon dioxide to potassium oxide mol ratio was the highest achievable without resulting in a soft coating. Sometimes even a 4.8:1 mol ratio was difficult to achieve when silicone was added to the binder to promote adhesion and to provide for easy mixing with zinc and aluminum particles, which were added as sacrificial elements for the protection of ferrous metals or aluminum alloys. Occasionally, however, sludging would sometimes result from the addition of the silicone.

Other prior art paint compositions utilized such ingredients as lithium hydroxide (LiOH) as the fluxing agent in the synthesis of inorganic alkali metal silicates in conjunction with silicon dioxide in the form of a hydrogel to attain the desired silicon dioxide to alkali metal oxide mol ratio. The hydrogel solution is fundamentally unstable with, for example, sodium oxide, without the addition of the lithium hydroxide which, if added, becomes a mixture of $Si\text{-}O^-\text{-}Li^+$ and $SiO^-$ and $Li^+$ as separated entities in solution. In the context of this invention, instability refers to the characteristic of the hydrated silicon-oxygen tetrahedral network or the tendency of some crystalline form of the silicon dioxide-alkali metal to spinoidally separate out. The lithium has the benefit of providing a more water insoluble paint after drying for a period of one day. However, use of lithium in the manufacture of silicates and sols provides binders, which when made into paints, dry to form softer coatings with often tenuous adhesive characteristics. Potassium silicate binders which proceed more slowly to insolubility offer harder coatings and improved adhesion compared with lithium silicates.

The prior art has also demonstrated how siliconsilicate binders containing potassium hydroxide as the fluxing agent can be manufactured reliably into a hydrogel sol to attain a mol ratio of 5.3 without sludging by the silicone or spinoidal decomposition during the shelf life of the binder. See, for example, my prior U.S. Pat. No. 4,162,169. This process also yielded hydrogel sol binders with a mol ratio of about 6, but with limited shelf life prior to undergoing spinoidal decomposition.

Since silica hydrogels contain up to 65% water, the manufacture of alkali metal hydrogel solutions and sols with solids contents greater than about 23% is impractical. To achieve greater solids contents, silica gel must be used. Of all of the alkali metal ions (Li, Na, K, Rb, Cs), only lithium and potassium possess the capability of promoting the manufacture of silicate binders with mol ratios greater than 5.0 which are stable. Lithium has the capability of suspending fully hydrated silica to a mol ratio of 6.4, whereas potassium can only promote the formation of such binders in the presence of aliphatic silanols. Lithium accomplishes this function by virtue of its electric field strength; potassium accomplishes the same function by virtue of its intermediate field strength, which is intermediate between (Li, Na) and (Rb, Cs), and its compatibility with aliphatic trisilanols. Thus, lithium forms bonds of the form

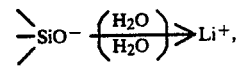

where ($H_2O$) represents a water sheath and $\rightarrow$ a polarized electric field, while the potassium bond is of the form

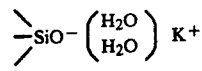

with negligible polarization. Without the silanol, lithium therefore provides more stable high mol ratio silicate binders than potassium by virtue of its closer association with the

moiety and a more tightly bound water sheath, which serves to prevent condensation of the siloxy groups. Condensation can only occur after

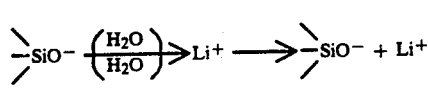

(1)

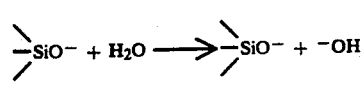

(2)

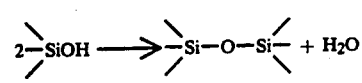

(3)

or in a pseudo fashion whereby the water sheath is dispelled viz:

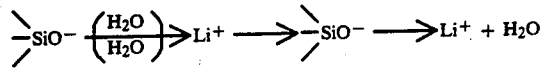

This grouping once formed is not readily solvated because of the high field strength of the lithium ion. Since potassium is already ionized from the siloxane group, reactions (2) and (3) can occur more readily. Potassium silicate binders can be produced to imitate those of lithium through the use of aliphatic silanols, particularly methyltrimethoxysilane $(CH_3Si(OCH_3)_3$, provided the silanol is the first ingredient added to the silicate starter solution. By so doing, the dominate reaction is

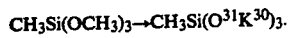

Because the bond between the methyl group and the silicon atom is polarized toward the silicone atom, this inductive effect introduces the possibility of the following reactions occurring:

and

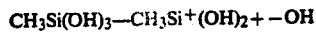

The latter possibility provides a cationic moiety which behaves more like lithium than potassium. This behavior provides a basis from which mol ratios to about 6.4 for potassium silicate-silicone binders can be formed to imitate those at the limit of lithium silicate which is also about 6.4.

The present invention provides an inorganic binder which exhibits superior corrosion protection capabilities over organic binders and which is especially valuable with respect to protection of ferrous metals and aluminum alloys in a salt environment.

SUMMARY OF THE INVENTION

Accordingly, it is an object of the present invention to provide inorganic binders and processes of making such binders.

Another object is to provide improved alkali metal silicate binders and processes of making such binders.

A further object of the invention is to provide improved binders with high silicon dioxide to alkali metal oxide mol ratios as well as the processes of making such binders.

Yet another object is to provide binders which are stable and do not sludge as well as the processes of making such binders.

Still another object is to provide inexpensive binders and the processes of making such binders.

Another still further object is to provide binders which are easy to apply and form hard coatings and the processes of making such binders.

A further object is to provide binders to which protective elements or pigments may be easily added and the processes of making such binders.

A still further object is to provide superior binders for the protection of ferrous metals or aluminum alloys.

These and other objects of the present invention are achieved by the provision of high single or mixed silicon dioxide to alkali metal oxide mol ratio inorganic alkali metal silicate binders, wherein the silicone induces and stabilizes the formation of a regular density silica gel sol in the presence of a partially hydrated silica gel and/or a sol.

Thus, the present invention provides an inorganic binder composition produced by a process which comprises:

(a) providing a starter alkali metal silicate aqueous solution;

(b) mixing the silicate solution with a silicone monomer and agitating until hydrolysis is essentially complete;

(c) adding an aqueous slurry of a silica gel and blending until the silica gel is at least partially dissolved; and (d) agitating to a smooth consistency and recovering the binder composition.

Also provided by the present invention is a binder composition wherein additional silicon dioxide having a different particle size is added to increase the silicon dioxide to alkali metal oxide mol ratio to the range of about 5.5 to 6.5, and then blending to a good consistency.

Also provided by the present invention is a brushable inorganic alkali metal silicate binder consisting essentially of air of alkali metal silicate solution, a silicone, a silica gel, and water, the ingredients being added in that order, said composition being an inorganic binder having superior corrosion protection capabilities and good brushability.

DESCRIPTION OF PREFERRED EMBODIMENTS

As indicated above, the present invention is concerned with inorganic binders and particularly with inorganic binders which are useful for the application of coatings. The present invention particularly provides alkali metal silicate based binders which have high silicon dioxide to alkali metal oxide mol ratios and which are in the form of a silica gel sol. The compositions of the present invention are characterized as having improved characteristics in their water resistance and are particularly useful for the application of coatings containing ferrous metals and aluminum alloys in a salt environment. The alkali metal silicate binders of this invention have high single or mixed silicon dioxide to alkali metal oxide mol ratios and are composed of a silicate, a silicone, a silica gel, and water. Colloidal silica, silica gels, and/or silica sols are added in a second embodiment. In this composition, the silicone induces and stabilizes the formation of a regular density silica gel sol in the presence of a partially hydrated silica gel and/or sol. By the term "mixed silicon dioxide silica gel sol" is meant that the silica gel originally added during the process of making the binder, while becoming fully hydrated by the fluxing action of the alkali metal hydroxide, utilizes the silicone molecules to maintain the gel particles in suspension while freeing the alkali metal ions to promote hydration of additional silica gel particles. This mechanism thus promotes the attainable mol ratios with fully hydrated silica. The degree of hydration of the silica gel particles which are present thus determines whether or not a mixed silicon dioxide binder has been formed. The resulting product will have the high mol ratios desired by the art and in particular may be described as having silicon dioxide or mixed silicon dioxide to alkali metal oxide mol ratios in the range of about 5.5:1 up to 6.5:1.

The novel binder composition of this invention is produced by initially providing a starting silicate solution which preferably has a solids content of about 30–40 weight percent and more preferably about 35–39 weight percent. This alkali metal silicate solution should have a silicon dioxide to alkali metal oxide mol ratio in the range of about 2.0:1 to 4.0:1 and preferably about 3.3:1 . This silicate solution is then charged to an agitated mixing vessel wherein sufficient turbulence is provided to prevent settling of solids.

A silicone monomer reactant is then added to the mixing vessel in an amount of about at least 1 percent by weight of the starting silicate solution and preferably about 1-25 weight percent. A preferred silicone monomer is an alkyl trialkoxy silane such as methyltrimethoxysilane or oligomer thereof. Any silane monomers of this type may be used. After addition of the silicone, agitation is continued until hydrolysis is relatively complete. Addition of the silicone at this stage is an important embodiment and serves to provide a different product from those known in the art.

Thereafter, with the mixture in the vessel in solution, a silica gel (not a hydrogel) in an amount of about 1–30 weight percent is added to the mixture. The resultant slurry is then vigorously blended until the silica gel at least partially dissolves with the remainder being hydrated. On completion of this addition, the viscosity should stabilize, although water may have to be added, after which agitation can be stopped and the mixture permitted to cool. Additional water may then be added after cooling to achieve suitable blending or viscosity and until gelled particles have dissipated. The product recovered at this stage is a good quality inorganic binder to which zinc dust or aluminum powder may be added to form a paint suspension having good brushability.

In a further embodiment, the mixed mol ratio binder of this invention having a higher silica to alkali metal oxide ratio is obtained through the addition of silica gel or colloidal silica to the binder once the above-described silica gel hydration process has been completed. In this embodiment, it is theorized that sufficient silicon dioxide is added as described above to increase the silicon dioxide alkali metal oxide mol ratio as high as possible. Thereafter, additional silicon dioxide is added to increase this mol ratio to the range of 6:1 to 6.5:1. In this aspect, it is preferred to add up to about 15 weight percent, preferably about 1% to 15 weight percent of silicon dioxide. In a still further embodiment, the added silicon dioxide will have large ($<350\mu$) and small ($<10\mu$) particle sizes and be added in a ratio of about 10 to 15 weight percent of the large particle size silicon dioxide and 1 to 5 weight percent of the small particle size silicon dioxide. When the silicon dioxide is added it forms a nascent $SiO_2$ precipitate which will be in suspension with the zinc dust or aluminum powder in the resulting paint composition. A local pH drop also occurs.

The resultant precipitate, when processed into a soft settleable ingredient, provides a paint with zinc dust and aluminum powder which has outstanding brushability, adhesion, and water resistance. The alkali metal and ethyl silicate based paints of the prior art normally must be sprayed because brushing creates abnormally large pores which cannot prevent rust bleedthrough when applied over ferrous metals. The present binder composition of this invention overcomes this need of the art.

The present invention employs well known and generally available components. Initially, a high silicon dioxide to alkali metal oxide mol ratio is obtained in stable form by converting the binder to a mixed mol ratio silica gel sol rather than a silica gel solution. A high silicon dioxide to alkali metal oxide mol ratio is desirable because the higher the mol ratio, the higher the water insolubility characteristic or the greater the water resistance of the applied coating. With respect to the instant invention, the high silicon dioxide to alkali metal oxide mol ratio is obtained by the addition of a substantial amount of silica gel. The process employed prevents a part of the silica gel from separating after initially going into solution. This is accomplished by creating conditions whereby a silicone-silicate sol is created.

The process is begun by weighing out a starter alkali metal silicate solution that has the alkali metal oxide silicon dioxide mol ratios described and with a solids content of from 35–39 percent. (The solids content here is the weight of the combined weights of the $SiO_2$ plus the $K_2O$ and/or $Na_2O$.) This starter silicate solution may be obtained from the Philadelphia Quartz Company as Kasil 6 or GTE, Sylvania, as PS7. These silicate solutions contain $K_2O$ and not $Na_2O$.

It has been found that using starter solutions with higher mol ratio than hereinbefore described will require longer time periods to make the binder. In turn, if a lower mol ratio solution is used, more silica gel would need to be added later in the process. In terms of solids content, a high solids content means that more water will have to be added later and a substantially lower solids content may mean that the process will not work.

The process is initiated by agitating the starter silicate solution. The preferred mode of mixing is to establish sufficient turbulence at the very beginning to prevent gel from settling and to maintain the turbulence throughout the remainder of the process.

Prior to the addition of the silica gel, a silicone such as methyltrimethyloxysilane is rapidly added to the agitated starter silicate solution and blended until hydrolysis is complete. The hydrolysis process is complete in less than about 10 minutes. Further fortification may be accomplished by the addition of an oligomer of methyltrisilanol once hydrolysis of the monomer is complete. Blending in this instance is continued until the ethanol solvent for the oligomer has dissipated. After modification of the starter silicate solution, the silica gel, ground to a particle size of less than 350 microns, is added to the modified starter silicate solution. The methyltrimethyloxysilane may be obtained from Dow Corning, Inc., designated as Z-6070, while the oligomer designated as 650 resin and the silica gel may be obtained from Owens Illinois, Inc., and W. R. Grace, Inc., respectively.

Once the silica gel has been added, turbulence must be maintained at a high level to prevent settling. Soon after the addition of the gel, the resultant mixture will commence to thicken. This process can be accelerated through the addition of heat. Temperatures elevated to 50° to 90° C., preferably about 70° C., are beneficial. Once thickening has commenced, water must be added in aliquots to prevent gelation and to reduce the pH of the mixture minimally after each addition. Once viscosity stabilizes and thickening proceeds from evaporation only, the mixing process is completed.

At this point, to further increase the mol ratio, additional silica may be added in the form of colloidal silica and/or micron-sized silica gel. To accomplish this part of the process, the silicone-silicate binder is first allowed to cool. Upon attaining room temperature, the binder is diluted to the desired solids content, and the required amount of silica is added to form a mixed mol ratio silicate binder.

Manufacturing silicate binders in this way permits a wider range of mol ratios to be attained. For example, in the initial sequence of steps where the silicon-silicate binder is made stable, silica gels can be made to a mol ratio of 6.5 utilizing the option of post dilution and the addition of micron-sized silica. Thus, the silicone-silicate sol can be manufactured to a mol ratio of 6.5.

A fully hydrated silica paint may then be formed with the addition of protective elements for ferrous metals and aluminum alloys such as zinc dust or aluminum which protect by galvanic action or by the addition of pigments for coloring or fillers to achieve a given film characteristic.

The binders resulting from the aforedescribed process will contain water, SiO$_2$ and silicone in the form of methylsilanol CH$_3$Si(OH)$_3$ or an oligomer of this monomer. Potassium oxide and/or lithium oxide may optionally be added. The solution will be in the form of a single or mixed mol ratio silica gel sol. It should be noted that no fully hydrated silica sludge is formed by the process and, therefore, no filtering is required. Such binders may also be used as paints over cementacious materials or possibly wood. They also may be used with a nonporous overcoating.

If zinc or aluminum is added to the binder, the amount of the metal that is added is calculated from the binder constituents present after drying, i.e., it is based on the solids content only. The amount of aluminum added is about 1–8 pounds per gallon. The amount of zinc added is in the range of 80–97 percent by weight of the total solids including the zinc itself. Since binder porosity is lower with less zinc, some applications would require less zinc.

Typical silicon dioxide to alkali metal oxide mol ratios in the binders of this invention are from 5.3 to 6.5, the inorganic solids content being from about 22–31 percent. Such binders will have approximate constituent percentage ranges by weight as follows (assuming that the starter silicate solution contains only K$_2$O):

Composition A–Mol ratio=5.3

| | |
|---|---|
| K$_2$O | 4.7–5.9% |
| Methyl Silanol | 0.4–2.7% |
| Polymethyl Silanol | 0.1–0.5% |
| SiO$_2$ | 16.2–22.7% |
| H$_2$O | 68.4–77.7% |

Composition B–Mol ratio=6.0

A mixed mol ratio binder which can be easily prepared having a mol ratio of 6 with a solids content from 22–31 percent may have constituent percentage ranges by weight as follows:

| | |
|---|---|
| K$_2$O | 4.8–5.9% |
| SiO$_2$ | 10.0–18.3% |
| Methyl Silanol | 1.3–2.6% |
| Polymethyl Silanol | 0.1–0.5% |
| SiO$_2$ (<350µ) | 6.2–12.4% |
| SiO$_2$ (<10µ) | 0–2.4% |
| H$_2$O | 68.4–75.4% |

Composition C

A binder with a silicon dioxide to potassium oxide mol ratio of 5.3:1 and an inorganic solids content from 22–31 percent by weight may have constituent percentage ranges as follows:

| | |
|---|---|
| K$_2$O | 4.7–5.6% |
| SiO$_2$ | 11.2–11.5% |
| Methyl Silanol | 1.3–2.4% |
| Polymethyl Silanol | 0.1–0.5% |
| SiO$_2$ (<350µ) | 9.3–11.2% |
| SiO$_2$ (<10µ) | 0–3.4% |
| H$_2$O | 69.1–74.4% |

It should be noted that ingredients have been listed in the order added with the unlabeled silica being contributed by the starter silicate solution. Both silica gels identified by their particle sizes contain about 3 percent water by weight and may be identified under the nomenclature, "regular density." The above examples have been given ranges at constant mol ratio to provide suitable flexibility in formulating each binder. By increasing the mol ratio with respect to SiO$_2$ (<350µ), the processing time is not increased when the methyl silanol is the first added ingredient. However, it is increased when the silanol is added as the last ingredient.

The invention is further illustrated by the following examples in which all parts and percentages are by weight. The examples are illustrative of two embodiments of the invention and are provided to teach one skilled in the art how to practice the invention and to represent one mode contemplated for carrying out the invention.

EXAMPLE 1

The following is a representative example of the process for formulating a mixed mol ratio binder with the fully hydrated silica component at 5.3 mol and the surplus hydrated silica component contributing an additional 0.7 mol to give a resultant mol ratio of 6.0.

(a) 2 kg of a starter silicate solution comprised of 35 percent, with a mol ratio of 3.3 (2.1 weight ratio) is weighed out into a baffled container and slowly agitated;

(b) 60 gms of methyltrimethyloxysilane and 3.3 grams of an oligenic methyl silane are weighed out and added to the starter silicate solution and stirred until the hydrolysis of the methyltrimethyloxysilane has been completed;

(c) After a period of 5–10 minutes the 300 grams (291 on a dry basis) of a regular density silica gel (10<size<350µ) are weighed out and slurried with 309 grams of demineralized water;

(d) 990 grams of demineralized water are weighed out;

(e) The rate of stirring of the starter silicate solution is now increased to about 3,000 RPM. The silica gel slurry is now added to the mixture;

(f) The resultant slurry is blended until the silica gel is partially dissolved with the remainder being fully hydrated. Aliquots of water are added in amounts large enough to keep the shaft of the agitator free of the mixture;

(g) Upon completion of the solvation process of the silica gel, which is apparent when the viscosity appears to stabilize (apart from the effect of evaporation), agitation is stopped and the container set aside to cool;

(h) Upon cooling, 833 grams of water are added while the binder is under agitation. Blending continues until gel particles have been dissipated;

(i) 62.7 grams of regular density silica gel (0.1<size<10µ) are weighed out and added to the remaining 100 grams of water to form a slurry;

(j) The slurry (i) is added to the binder as it is being agitated. Once a smooth consistency has been reached, the mixture is allowed to undergo settling, as the silica gel reacts with the hydrated silica gel and settles to the bottom of the container;

(k) After settling is complete, the mixture is reagitated to smooth consistency and canned while under agitation.

EXAMPLE 2

The following is a representative example of the process for formulating a mixed mol ratio binder with the fully hydrated silica component at 5.75 mol and the surplus hydrated silica component contributing an additional 0.65 mol to give a resultant mol ratio of 6.4.

(a) 2 kg of a starter silicate solution comprised of 35 percent, with a mol ratio of 3.3 (2.1 weight ratio) is weighed out into a baffled container and slowly agitated;

(b) 100 grams of methyltrimethyloxysilane and 3.3 grams of an oligenic methyl silane are weighed out and added to the starter silicate solution and stirred until the hydrolysis of the methyltrimethyloxysilane has been completed;

(c) After a period of 5-10 minutes, the 363.67 grams (352.8 on a dry basis) of a regular density silica gel (10<size<350μ, 3 percent water) are weighed out and slurried with 360 grams of demineralized water;

(d) 1,220 grams of demineralized water are weighed out;

(e) The rate of stirring of the starter silicate solution is now increased to about 3,000 r.p.m. The silica gel slurry is now added to the mixture;

(f) The resultant slurry is blended until the silica gel is fully hydrated. Aliquots of water are added in amounts large enough to keep the shaft of the agitator free of the mixture;

(g) Upon completion of the solvation process of the silica gel, which is apparent when the viscosity appears to stabilize (apart from the effect of evaporation), agitation is stopped and the container set aside to cool;

(h) Upon cooling, 833 grams of water are added while the binder is under agitation. Blending continues until gel particles have been dissipated;

(i) 93.4 grams of regular density silica gel (1<size<10μ) are weighed out and added to the remaining 100 grams of water to form a slurry;

(j) The slurry (i) is added to the binder as it is being agitated. Once a smooth consistency has been reached, the mixture is allowed to undergo settling, as the silica gel reacts with the hydrated silica gel and settles to the bottom of the container;

(k) After settling is complete, the mixture is reagitated to smooth consistency and canned while under agitation.

The invention has been described with reference to certain preferred embodiments. However, as obvious variations thereon will become apparent to those skilled in the art, the invention is not to be limited thereto.

What is claimed is:

1. An inorganic alkali metal silicate binder composition, in the form of a mixed silicon dioxide silica gel sol, comprising an alkali metal silicate, a silicone, silica gel, and water, said composition having a silicon dioxide to alkali metal oxide mol ratio of about 5.5-6.5:1, the composition being formed by adding the silicone to the alkali metal silicate contained in aqueous solution and then adding the silica gel with agitation, wherein the silica gel added becomes fully hydrated by the fluxing action during reaction and utilizes the silicone molecules to maintain the gel particles in suspension while freeing the alkali metals ions to promote hydration of additional gel particles; said composition having good brushability when applied as a binder for a paint composition.

2. A composition according to claim 1 wherein the alkali metal silicate is sodium silicate or potassium silicate.

3. A composition according to claim 2 wherein the silicone is a methyltrimethyloxysilane.

4. A composition according to claim 1 to which additional colloidal silica or a silica sol are added.

5. A composition according to claim 4 wherein the additional colloidal silica has a particle size of between 0.1 and 10 microns.

6. A paint composition containing the inorganic binder of claim 1 and also contains zinc dust or aluminum powder.

7. A paint composition according to claim 4 wherein the composition also contains zinc dust or aluminum powder.

8. A method for the production of an inorganic binder composition by a process which comprises:
(a) providing a starter alkali metal silicate aqueous solution;
(b) mixing the silicate solution with a silicone monomer and agitating until hydrolysis is essentially complete;
(c) adding an aqueous slurry of a silica gel to the silicate solution and blending until the silica gel is at least partially dissolved; and
(d) agitating the mixture to a smooth consistency and recovering the binder composition.

9. A method according to claim 8 wherein the alkali metal silicate is sodium silicate, potassium silicate, or a mixture thereof, and the solution has an $SiO_2$ to $Na_2O$ mol ratio in the range of about 2.0-4.0.

10. A method according to claim 9 wherein about 1-25 weight percent of silicone monomer is added to the solution, based on the weight of the silicate solution.

11. A method according to claim 10 wherein sufficient turbulence is maintained in the reaction to cause hydrolysis of the silicone monomer and essentially complete hydration of the silica.

12. A method according to claim 10 wherein the silicone monomer is methyltrimethyloxysilane.

13. A method according to claim 12 wherein temperatures are elevated to the range of about 50°-90° C. after addition of the silica gel.

14. A method according to claim 13 wherein additional water is added in aliquots to prevent gelation and to reduce the pH of the mixture after addition of the silica gel.

15. A method according to claim 14 wherein a sufficient amount of an additional silica selected from the group consisting of colloidal silica or micron-sized silica gel is added to the mixture to further increase the mol ratio of silica to alkali metal oxide after addition of the silica gel.

* * * * *